Feb. 9, 1937. J. Z. BRUBAKER 2,069,749
AUTOMATIC DUAL TEMPERATURE COOLING SYSTEM FOR MOTORS
Filed June 12, 1934
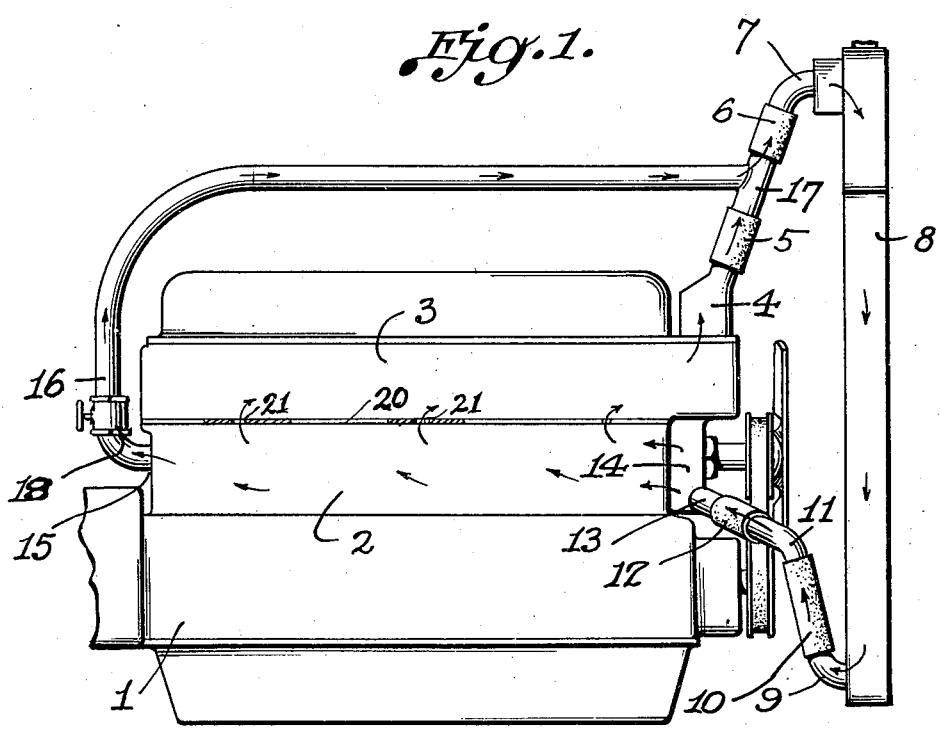
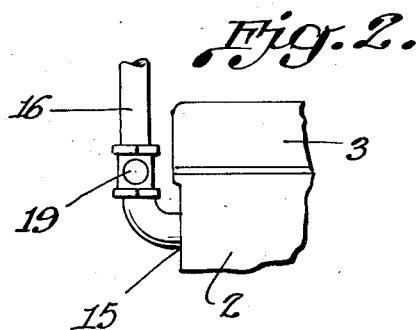
Inventor:
J. Z. Brubaker:
by Lester L. Sargent
Atty.

Patented Feb. 9, 1937

2,069,749

UNITED STATES PATENT OFFICE 2,069,749

AUTOMATIC DUAL TEMPERATURE COOLING SYSTEM FOR MOTORS

Jacob Z. Brubaker, Manheim, Pa.

Application June 12, 1934, Serial No. 730,355

1 Claim. (Cl. 123—178)

This application is an improvement upon my Patent 1,985,240 for Forced feed cooling system for motors and of my Patent 1,789,540, and is an improvement and in part a continuation of my Patent 1,962,134 patented June 12, 1934.

The object of my invention is to provide an improvement over my prior cooling systems for maintaining the heat of the head at a higher temperature than in the block of the motor, to improve combustion and maintain proper lubrication, whether the automobile is driven at low or high speed; and to provide novel means for facilitating the starting of the engine in cold weather; and to provide novel means for use in emergency, such as when there is a leaky radiator, and for maintaining the proper operation of the motor. I attain these and other objects of my invention by the apparatus illustrated in the accompanying drawing, in which—

Fig. 1 is a side elevation of my invention; and

Fig. 2 is a detailed side elevation view of a modification of same, showing a thermostat installed in conduit 16.

Like numerals designate like parts in each of the views.

Referring to the accompanying drawing:—

I provide a cylinder block 1 having the usual cylinder jacket 2 and cylinder head 3. Opening out of the cylinder head 3 I provide a thermostat 4, connected to which is a rubber coupling 5, which in turn is connected to the metal conduit section 17, which in turn is connected by rubber coupling 6 to the conduit 7, which opens into the upper end of the radiator 8.

I provide a conduit 9, opening out of the lower end of the radiator. I provide a rubber coupling 10, connecting conduit 9 with conduit 11, which in turn is connected by rubber coupling 12 with the conduit 13 opening into the pump casing 14, by which water is forced through the water jacket 2, as indicated by the arrows, some of the water passing through the aperture 21 in the gasket 20 and into the cylinder head 3, while some of the water passes through the outlet 15 into and through the by-pass 16 to the conduit section 17, which is connected with the upper end of the radiator.

As shown in Fig. 1 of the drawing, I provide a suitable manually operated valve 18 in the lower end of the by-pass 16, by which the circulation of the water through that by-pass may be stopped when desired to meet emergency conditions. As shown in Fig. 2, in lieu of manually operated valve 18, I may provide a thermostat 19 for automatic regulation of the circulation of water through by-pass 16. In operation the water circulates as indicated by the arrows, being pumped by the pump casing 14 through the water jacket 2, some of the water passing through the apertures 21 in the gasket 20 into the cylinder head 3, and some of the water passing through the outlet 15 into the by-pass 16. From cylinder head 3 the water passes through thermostat 4, coupling 5, conduit 17, coupling 6 and conduit 7 into the inlet reservoir of the radiator, from whence it flows downward into the bottom of the radiator, through conduit 9, coupling 10, conduit 11, coupling 12 and conduit 13, into the pump casing 14, to complete the operation. The water flowing through by-pass 16 increases the circulation of cooler water through the cylinder block, and when it flows into the stream flowing through conduit 17 it is relatively cooler and tends to reduce the temperature of the water, flowing thence through members 6 and 7 into the radiator, and also tends to check the evaporation of alcohol and water by reducing the temperature of the liquid. At the outset, thermostat 4 closes the conduit 5 until the desired temperature is reached, when it will open that conduit and permit some of the water to flow directly through that conduit while a portion of the water continues to flow through by-pass 16.

When an automobile is driven at a speed of 45 miles an hour, or less, the temperature of the water in the cylinder head 3 will be approximately 180 degrees Fahrenheit, while the temperature of the water in the water jacket 2 of the cylinder block will be approximately 100 degrees Fahrenheit. If the automobile is traveling at a high speed of, say, 60 miles an hour, or over, the temperature of the water in the cylinder head 3 will drop to approximately 160 degrees Fahrenheit, and the temperature of the water in the water jacket 2 of the block will rise to approximately 120 degrees Fahrenheit. In a case of emergency, where it is necessary to run at low gear, as in traveling through mud, or sand, or snow, or in case of a leaky radiator when the water is low, the operator closes the manually operated valve 18 part way or altogether, to bring about the conventional water circulation.

In the modification of the invention illustrated in Fig. 2 of the drawing, I provide an automatic thermostatic valve 19 to automatically control the circulation of water through the by-pass 16. In starting the motor when the water is at low temperature, the valve would be in closed position while the engine is being warmed up. As the temperature rises, at a predetermined degree the thermostatic valve will open and allow the circulation of water through the by-pass in the manner heretofore described.

What I claim is:—

In an automatic dual temperature system for internal combustion engines, the combination of a cylinder block having a water-jacket, a cylinder-head having a water-jacket in communication with said cylinder-block water jacket, a radiator, a conduit extending from the cylinder-head water jacket to the radiator and having a thermostatic valve therein, a continuously open conduit through which water from the water jacket of the cylinder block may flow into the conduit which leads from the cylinder head to the radiator at a point between the thermostatic valve and the radiator, and a conduit from the radiator to the adjacent end of the water jacket of the cylinder block.

JACOB Z. BRUBAKER.